United States Patent
Stein et al.

(10) Patent No.: US 7,642,516 B2
(45) Date of Patent: *Jan. 5, 2010

(54) METHOD FOR STABILIZING THE TEMPERATURE DEPENDENCY OF LIGHT EMISSION OF AN LED

(75) Inventors: Juergen Stein, Wuppertal (DE); Guntram Pausch, Dresden (DE); Karen Saucke, Solingen (DE)

(73) Assignee: ICx Technologies GmbH, Solingen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 11/870,341

(22) Filed: Oct. 10, 2007

(65) Prior Publication Data

US 2008/0111079 A1    May 15, 2008

Related U.S. Application Data

(63) Continuation of application No. 11/128,119, filed on May 10, 2005, now Pat. No. 7,339,173.

(30) Foreign Application Priority Data

May 14, 2004    (WO) ................ PCT/EP2004/050813

(51) Int. Cl.
*G01T 1/15* (2006.01)
(52) U.S. Cl. .................................. 250/363.09
(58) Field of Classification Search ............. 250/363.09
See application file for complete search history.

(56) References Cited

U.S. PATENT DOCUMENTS

| 4,160,165 | A | 7/1979 | McCombs et al. |
| 4,600,876 | A | 7/1986 | Boeckmann |
| 4,857,722 | A | 8/1989 | Kumazawa et al. |
| 6,163,027 | A | 12/2000 | Nakamura et al. |
| 6,807,202 | B1 | 10/2004 | Plamper et al. |
| 7,339,173 | B2 * | 3/2008 | Stein et al. ............. 250/363.09 |
| 2002/0190666 | A1 | 12/2002 | Sakamoto et al. |
| 2003/0156606 | A1 | 8/2003 | Althaus et al. |
| 2004/0016884 | A1 | 1/2004 | Williams et al. |
| 2004/0188624 | A1 | 9/2004 | Wong et al. |

FOREIGN PATENT DOCUMENTS

| EP | 1039597 A | 9/2000 |
| EP | 1283569 A | 2/2003 |

* cited by examiner

*Primary Examiner*—David P Porta
*Assistant Examiner*—Marcus H Taningco
(74) *Attorney, Agent, or Firm*—IP Strategies

(57) ABSTRACT

Method for correction of the temperature dependency of a light quantity L emitted by a light emitting diode (LED), being operated in pulsed mode with substantially constant pulse duration $t_P$, and measured in a light detector, using a predetermined parameter X, correlated to the temperature T of the LED in a predetermined ratio, whereby a correction factor K is determined from the parameter X, preferably using a calibration table, especially preferred using an analytic predetermined function, whereby the measured emitted light quantity L is corrected for the temperature contingent fluctuations of the emitted light quantity, whereby the parameter X is determined from at least two output signals of the LED, which are related to each other in a predetermined manner.

10 Claims, 7 Drawing Sheets

METHOD FOR STABILIZING THE TEMPERATURE DEPENDENCY OF LIGHT EMISSION OF AN LED

FIELD OF THE INVENTION

The invention relates to a method for correcting the temperature dependency of a light quantity emitted by a light-emitting diode (LED), which is operated in pulsed mode with substantially constant pulse duration, and measured in a light detector.

BACKGROUND OF THE INVENTION

The emitted light quantity of an LED depends on its temperature. In laboratory applications according to prior art, according to which an LED is employed as reference light source, the LED and possibly the measuring apparatus associated therewith are tempered, resulting in the temperature and, thus, the emitted light quantity of the LED remaining constant.

In applications outside the laboratory, in which such a climatisation is not possible at all or only at increased expenditure, it is therefore necessary to correct the measured values of the light quantity with respect to the temperature contingent influences, to thereby reduce the errors of the measured result. In case such an LED is used for example as light source for stabilization of a photo multiplier, which for example is employed as light detector in a scintillation detector, for example a mobile detector for identification of radio isotopes (hand held radio isotope identification device—RID), the LED is exposed to thermal fluctuations in the range of −20° C. to +50° C. Thereby, the system amplification of the light detector can fluctuate offhand for about 20% and more, such that a stabilization of the amplification of the light detector is necessary, to maintain the energy amplification and the energy resolution of the RID sufficiently good. For stabilization of such a light detector with an LED, it is therefore necessary, to know the temperature dependency of the light quantity emitted by the LED.

Methods for stabilization are known, according to which the temperature is measured at or in the detector and the temperature caused effects are adjusted by means of previously measured calibration tables. These methods, however, have the drawback that a temperature measurement with fast temperature changes is only hardly realizable, particularly for the reason that often no uniform temperature distribution can be expected in the detector. Besides, the amplification of, for example, a photo multiplier does not only depend on its temperature, but rather also on the effective counting rate and its previous history, i.e. its hysteresis and age. It has been found that sufficiently exact prediction of the amplification under consideration of all parameters is not possible.

For stabilization, therefore, often active methods are employed during the actual measurement. Mostly, radio active calibration sources or natural background radiation are used, to achieve such an active stabilization. This, however, leads to optimization problems, because a compromise of sufficiently short but nevertheless sufficiently exact calibration measurements has to be found. Additionally, each additional radio active radiation leads to a reduction of the total sensitivity of the system.

An alternative is the separated stabilization of light detector and scintillator—the latter is for example disclosed in PCT/EP2004/050754. It is known to use a pulsed light source, for example an LED, as measured standard for the stabilization of the light detector. It is also known to stabilize and to monitor the amplification of light detectors in this manner in laboratory applications. Disadvantageous with respect to this prior art is that the light emission of an LED depends on its temperature, more particular, on its junction temperature $T_{LED}$. Thus, according to known methods, it is either necessary, to keep the temperature constant or to monitor it at least, or to monitor the light quantity emitted respectively by the LED with a separate measurement apparatus precisely. Such an assembly is not only technically complex and cost intensive, but rather requires also additional energy and additional space, complicating the use in battery operated mobile RIDs.

From sensor techniques, a method is known, to measure the temperature of semiconductor elements by means of a current measurement at constant operating voltage or by means of a measurement of the flux voltage at constant current.

EP 1,283,569 A2 discloses the correction of the light emission of an LED as a function of the temperature and by using a characteristic parameter curve. The disadvantage of this method is, that an additional element, namely a temperature sensor is necessary.

EP 1,039,597 A2 describes the stabilization of the light emission of an LED on the basis of the measured current and voltage at the LED itself. A stabilization of the effective light emission does not take place so that substantial uncertainties remain. In addition, only certain LED's may be used at all.

U.S. Pat. No. 4,160,165 is discussing the problem of stabilization of a x-ray detector, being operated in a pulsed mode, so that the output current of the photomultiplier is kept constant during the pulsed operation. This invention is designed to correct for background noise during the x-ray measurement. Corrections of temperature dependencies or even an energy stabilization are not an object oft this disclosure.

BRIEF SUMMARY OF THE INVENTION

Therefore, it is an object of the invention, to provide a method avoiding the drawbacks of prior art mentioned above, to reduce the expenditure for the stabilization of light detectors by means of pulsed LEDs.

Further, it is an object of the invention, to provide a light detector, the signals of which, including the pulse amplitude spectrum produced by the associated electronics, can be corrected and, thus, stabilized by means of pulsed LED with respect to temperature dependency and otherwise caused fluctuations. Moreover, it is an object of the invention, to provide a detector for measuring radiation, preferably ionized radiation, which can be stabilized by a pulsed LED.

These objects are at first solved by the method and devices according to the claims. Thus, a method is provided, according to which the emitted light quantity L of a light emitting diode being temperature dependent is corrected, using a predetermined parameter X being in a predetermined relation to the temperature T of the LED. From the parameter X, a correction factor K is thereby determined, preferably using a calibration table, especially preferred using an analytic predetermined function, according to which the measured emitted light quantity L is corrected for the temperature-caused fluctuations of the emitted light quantity. Thereby, the diode is operated in pulsed mode with substantially constant pulse duration $t_P$. The parameter X, thereby, is determined from at least two output signals of the LED itself, which are related with respect to each other in a predetermined manner.

Thereby, it has been found to be advantageous, to determine at first the temperature T of the LED from the measured parameter X, whereby a calibration table can be used. Preferably, it is also possible to use an analytic predetermined function. Subsequently, the correction factor K is determined from the temperature T, whereby also preferably a calibration table or an analytic predetermined function is used.

Moreover, a method for temperature stabilization of a light emitting diode (LED) is provided, whereby the LED is operated in pulsed mode with substantially constant pulse duration $t_P$, whereby a predetermined parameter X is used as command variable, associated to the temperature T of the LED in a predetermined relation, whereby the parameter X is determined from at least two output signals of the LED, which are related to each other in a predetermined manner.

It has been found to be advantageous, to operate the LED such that the pulse duration $t_P$ is substantially constant, the voltage applied to the LED, however, changing between at least one first voltage $U_{P1}$ and at least a second voltage $U_{P2}$, being different from the first voltage $U_{P1}$. During the pulse, the respective voltage is substantially constant. Then, the average light quantities $L(U_P)$ of the pulses at different voltages $U_P$ are measured, thus, at least the average light quantity $L(U_{P1})$ of the pulse at voltage $U_{P1}$ and the average light quantity $L(U_{P2})$ of the pulse at voltage $U_{P2}$. The determination of the parameter X is then derived from the ratio of the light quantities $L(U_P)$ with respect to each other. The use of the ratio of at least two light quantities at constant pulse duration but at different voltages leads to the fact that amplification fluctuations of the light detector caused by temperature fluctuations or by other effects do not have any influence on the determination of the parameter X.

The method can also be configured such that a current to the LED being in pulsed mode at also constant pulse duration $t_P$, periodically alternating between at least a first value $I_{P1}$ or at least a second value $I_{P2}$, being different from the first one, is applied. During the pulse, the current, flowing through the LED, is respectively substantially constant. Then, the average light quantities $L(I_P)$ of the pulses with the different currents $I_P$, thus, at least the average light quantity $L(I_{P1})$ of the pulse with the current $I_{P1}$ and the average light quantity $L(I_{P2})$ of the pulse with the current $I_{P2}$, are measured. The parameter X is then determined from the ratio of the light quantities $L(I_P)$ with respect to each other.

To suppress the influence of turn on and turn off effects or similar influences to the light emission of the LED, it has been found to be especially advantageous, to determine the parameter X as follows: Operating the LED in pulsed mode such that the pulse duration $t_P$ takes substantially two different substantially constant values $t_{PS}$ and $t_{PL}$ and the voltage alternates between at least a first voltage $U_{P1}$ and at least a second voltage $U_{P2}$, being different from the first voltage $U_{P1}$ periodically at the LED, measuring the average light quantities $L(U_P; t_{PS})$ and $L(U_P; t_{PL})$ of the pulses with at least the voltages $U_{P1}$ and $U_{P2}$ and the pulse durations $t_{PS}$ and $t_{PL}$, determining the differences $D_{P1}$ and $D_{P2}$ of the light quantities $L(U_{P1}; t_{PL})$ and $L(U_{P1}; t_{PS})$ as well as $L(Up_2; t_{PL})$ and $L(U_{P2}; t_{PS})$, and determining the parameter X from the ratio of the differences of the light quantities.

Just as well, it is possible to determine the parameter X as follows: Operating the LED in pulsed mode such that the pulse duration $t_P$ takes substantially two different substantially constant values $t_{PS}$ and $t_{PL}$, and the current flowing through the LED alternates periodically between at least a first value $I_{P1}$, and at least a second value $I_{P2}$, being different from $I_{P1}$, measuring the average light quantities $L(T_P; t_{PS})$ and $L(I_P; t_{PL})$ of the pulses with at least the currents $I_{P1}$ and $I_{P2}$ and the pulse durations $t_{PS}$ and $t_{PL}$, determining the differences $D_{P1}$ and $D_{P2}$ of the light quantities $L(I_{P1}; t_{PL})$ and $L(I_{P1}; t_{PS})$ as well as $L(I_{P2}; t_{PL})$ and $L(I_{P2}; t_{PS})$, and determining the parameter X from the ratio of the differences of the light quantities.

Further, it has been found to be advantageous, if the light quantities $L(U_P;)$ and $L(I_P)$, respectively, i.e. at least the light quantities $L(U_{P1})$ and $L(U_{P2})$ or $L(I_{P1})$ and $L(I_{P2})$, are determined with a light detector, preferably a photo multiplier, a hybrid photo multiplier, an Avalanche photo diode or a photo diode with amplifier. The light quantities measured with this light detector are preferably determined by application of one or more of the following method steps: Carrying out pulse amplitude spectrometry of the detector signals and/or measuring the average current flow in the light detector and/or measuring the charge quantity produced in the photo sensitive layer of the light detector by the LED pulse, preferably by means of spectrometry of the, already amplified, charge signals triggered by the LED pulses.

It is further advantageous, if the LED comprises a swamping resistance, whereby the swamping resistance is selected particularly advantageous in that its resistance does not depend on temperature T in a linear manner, especially preferred in a manner that the dependency or at least the non-linearity of the dependency of the correction factor K from the temperature T is compensated approximately by the temperature dependency of the swamping resistance.

Further, a method for stabilizing a light detector is claimed, preferably a photo multiplier, a hybrid photo multiplier, an Avalanche photo diode or a photo diode with amplifier, whereby the light detector is optically connected to at least an LED, whereby at least an LED is operated in pulsed mode and according to which the output signals of the light detector are stabilized with a stabilizing factor, whereby the stabilizing factor is generated by the signals of the at least one LED and according to which the temperature dependency of the light emission of at least one LED is corrected by means of one of the methods described above.

Further, a method for stabilization of signals generated by a scintillating detector for measuring radiation is claimed, preferably ionized radiation, whereby the signals are generated by the radiation which is at least partly absorbed in the detector, and which depend on the operating temperature of the detector, whereby by scintillating detector has at least one light detector and at least one LED optically connected thereto, whereby the stabilizing factor for stabilizing the scintillation detector is generated from the signals emitted by at least one LED, and according to which the temperature dependency of the light emission of the LED is corrected according to one of the methods described above and claimed in claims 1 to 11. It can also be an advantage, if at least one, preferably the optical connection between the LED and the scintillating detector is designed in a heat conducting manner, because then the temperature of the LED being heat-conductingly connected to the scintillating detector substantially corresponds to the temperature of the scintillator.

In all the methods described above, signal processing is preferably carried out digitally.

Moreover, a light detector with a signal processing device is claimed, preferably a photo multiplier, a hybrid photo multiplier, an Avalanche photo diode or a photo diode with amplifier, whereby at least one LED is optically connected to the light detector, according to which at least an LED is operated in pulsed mode and the output signals of the light detector are stabilized by a stabilizing factor, whereby the stabilizing factor is generated from the signals generated by the at least one LED, and according to which the temperature dependency of the light emission of at least one LED is corrected with a method described above and claimed in claims 1 to 11. Here, the signal processing preferably is carried out digitally.

Further, a scintillation detector for measuring of radiation is claimed, preferably ionized radiation, whereby the scintillation detector has at least one light detector described above, measuring the light generated by the scintillation detector at least partially. In a special embodiment, signals are measured which are generated by the radiation absorbed at least partially in the detector and being dependent on the operating temperature of the detector, and are stabilized by a stabilizing factor being in a predetermined relation to the temperature T of the scintillator, whereby at least an LED of the light detector is connected to the scintillation detector in a heat conducting manner, and whereby the temperature dependency stabilizing factor S for stabilizing the scintillation detector in a predetermined manner, preferably using a calibration table, in particular preferred using a predetermined functional dependency, is determined from parameter X of at least one LED being connected to the scintillation detector in a heat-conducting manner according to one of the process steps described above. Preferably, the scintillator comprises crystal scintillation material.

The present invention provides a technically very simple and convenient method for temperature stabilization of LED reference light sources, which, for example, are used for stabilization of light and/or scintillation detectors, in that it analyses the pulse amplitude spectrum of LED signals, which have to be measured anyway for stabilization. Therefore, neither a radio active calibration source is necessary, nor the use of an additional light detector for monitoring the light quantity emitted by the LED in dependency from the temperature. The light detector, being present anyway, is sufficient, the stability of which does not matter anyway, as long as its amplification only alternates in periods of time, which are larger than the switching interval of the different LED modi. This switching interval can be kept very small (up to <1 ms), but is at least as large as the temporal distance between two LED pulses.

BRIEF DESCRIPTION OF THE DRAWINGS

In the following, preferred embodiments are described by means of the figures, described subsequently, showing.

DETAILED DESCRIPTION OF THE INVENTION

Figure 1:
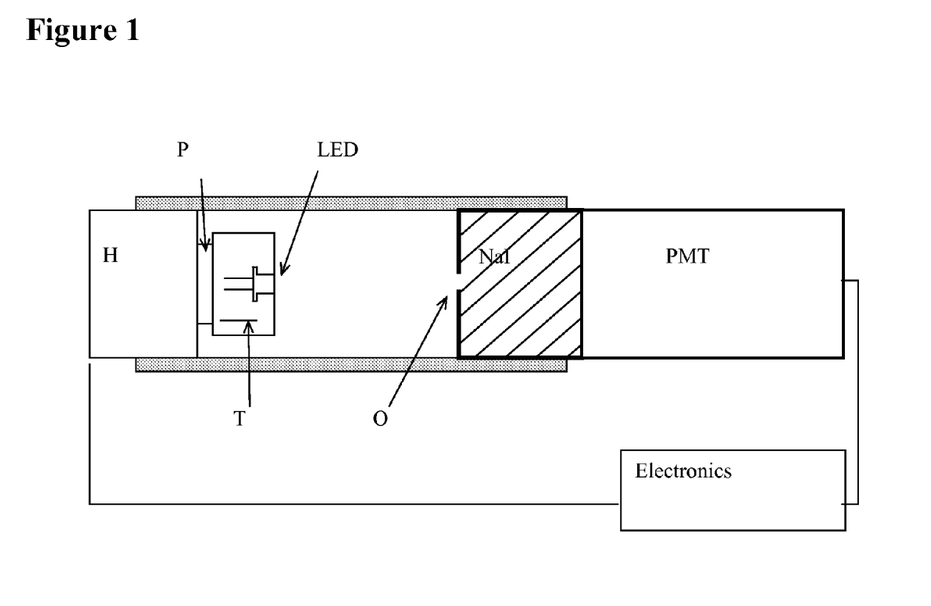
FIG. 1 Measuring device for calibrating the LED.

In a test and calibration device according to FIG. 1, an LED is arranged such that it can be heated and cooled independent of the scintillation detector, comprising an $NaI(T_1)$-scintillator crystal and photo multiplier PMT, by means of a Peltier element P and a cooling element H. Thereby, the LED is accommodated in a tempered aluminum block, the temperature of which is measured with a conventional temperature sensor T. The light of the LED enters into the scintillator crystal through an optical window O.

The LED is supplied with an adjustable voltage by a driver circuit in pulsed mode. The driver circuit itself, as also the entire electronics otherwise required, is shown in FIG. 1 only schematically. The pulse length is also adjustable and is stabilized by a quartz generator. It can be varied controlled by a program during the measurements between several fixed values.

A further control unit provides for switching the voltage applied during the pulse to the diode regularly automatically in a time lag of respectively several seconds between two pre-determinable stabilized values $U_{P1}$ and $U_{P2}$.

The shapes of the pulses applied to the diode respectively are illustrated schematically in FIGS. 2, 3a and 3b, which are further explained below.

For checking the function of the system, a radioactive $^{137}Cs$-source is fixed to the NaI(T1) scintillator, which generates corresponding signals in the scintillation detector. The entire arrangement, including electronics, is accommodated in a climatic cabinet, the interior temperature of which can be modified controlled by a program or can be kept constant.

For the measurements described in the following, an LED having a maximum of the wave length spectrum in the blue range, namely at approximately 430 nm, was used as an example, corresponding approximately to the spectral distribution of the emission light of an NaI(T1) scintillator crystal.

It is known that the average light quantity emitted by the LED depends on its temperature at otherwise constant operating conditions. The corresponding temperature dependency was measured by means of this arrangement as follows:

keeping climatic cabinet at constant temperature increasing or reducing temperature $T_{LED}$ of the LED by means of the Peltier element measuring temperature $T_{LED}$ of the LED by means of a temperature sensor until $T_{LED}$ remains constant recording and analyzing the pulse amplitude spectrum in the selected measuring regime.

Figure 4:
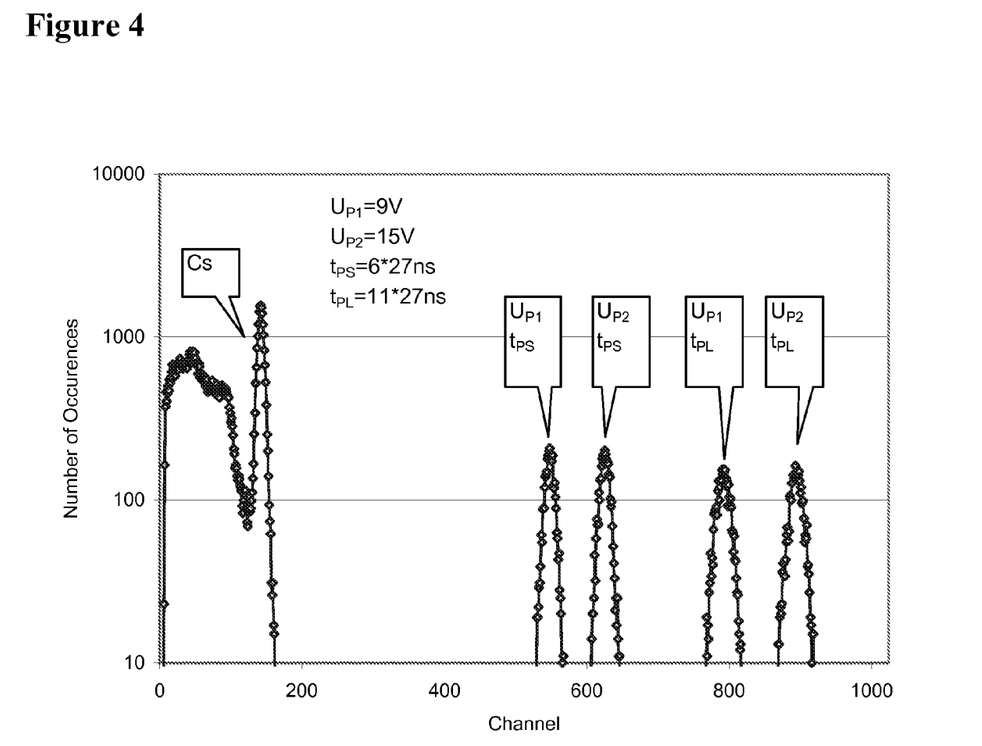
FIG. 4 Pulse amplitude spectrum of LED pulses.

FIG. 4 shows exemplarily a measured pulse amplitude spectrum. During the measurement, $U_P$ was switched regularly between the values $U_{P1}$ and $U_{P2}$, the pulse length $t_P$ was regularly switched between the values $t_{PS}$ and $t_{PL}$. Each combination of $U_P$ and $t_P$ generates a peak in the spectrum, the position of which is a measure for the light quantity $L(U_P, t_P)$ emitted by the diode on average and detected in the detector. In the left part of the drawing, the pulse amplitude spectrum generated by the $^{137}Cs$ source in the scintillating detector can be seen additionally. In the following drawings and formulas, L is equated to the position of the corresponding peak due to the fixed relationship of the two variables with respect to each other.

Figure 5:
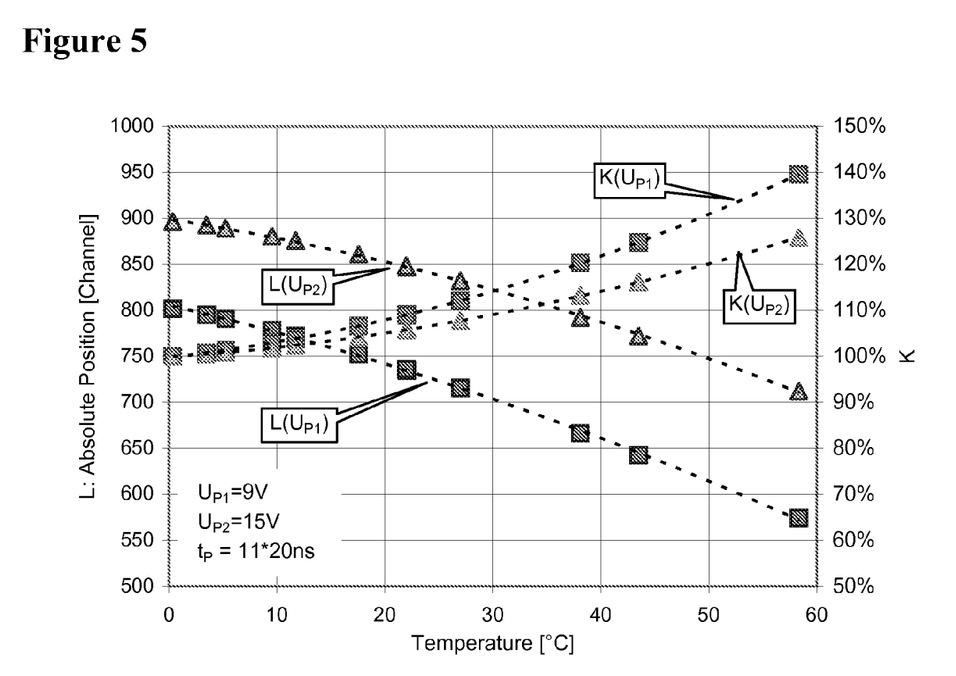
FIG. 5 Dependency of the light quantity L and the correction factors K of the LED temperature of two operating regimes of the LED (measured values), derived therefrom.

FIG. 5 shows the measured dependency of the emitted light quantity L from the temperature $T_{LED}$ for two different operating regimes, which are characterized by equal pulse lengths, but different voltage values $U_{P1}$ and $U_{P2}$. The variation of the light quantity L with respect to the temperature $T_{LED}$ can be clearly seen. Also shown are the correction factors $K(U_{P1})=L_0/L_1(T_{LED})$ and $K(U_{P2})=L_0/L_2(T_{LED})$ by means of which the light quantities L and, thus, the peak positions of the peak measured with respect to the pulses with the voltages $U_{P1}$ and $U_{P2}$ have to be corrected, to correct temperature contingent changes of the light emission of the LED.

Figure 2:
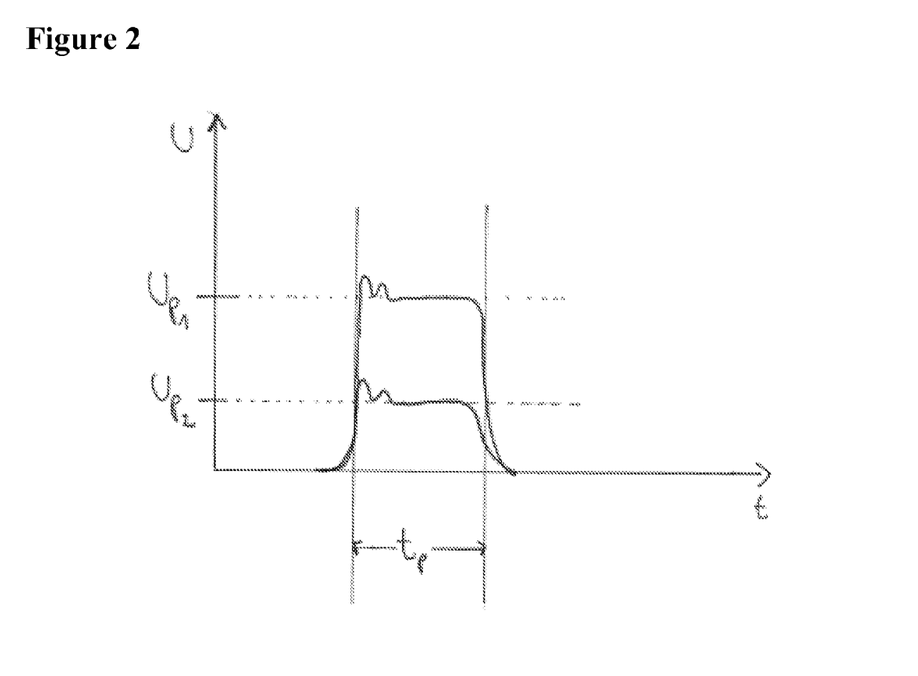
FIG. 2 Voltage courses $U_{P1}$ and $U_{P2}$ at the LED depending on time t.

The corresponding voltage pulses respectively applied to the LED are shown in FIG. 2 schematically, in which the two voltages $U_{P1}$ and $U_{P2}$ as well as the pulse length $t_P$ are shown. There, also the finite signal rising and falling times as well as the transient effects during turning on of the signals are shown.

Figure 6:
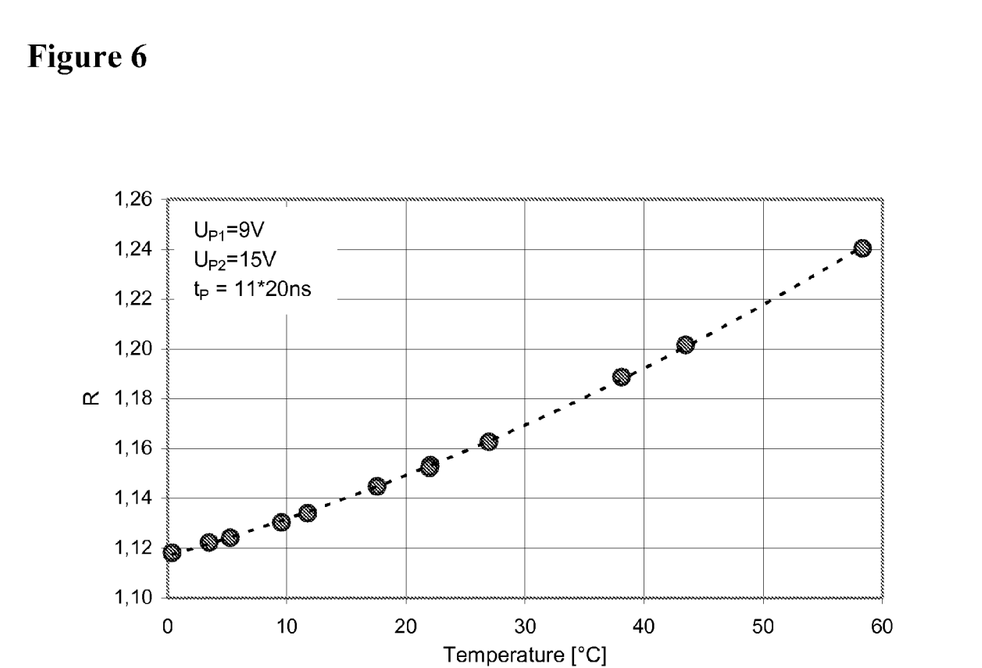
FIG. 6 Dependency of the light quantity ratio R, determined from the measured values shown in FIG. 5 from the LED temperature.

From the two peak positions, the ratio $R=L(U_{P1})/L(U_{P2})$ is determinable. Due to the non-linearities of the characteristic curve of the LED, this ratio is not constant, but rather changes as shown in FIG. 6 with the temperature $T_{LED}$. The variable R, thus, determined, does not depend on the amplification of the light detector, as long as the detector signals are proportional to the light quantity L detected. This proportionality (linearity of the detector response) is actually given and was detected in additional measurements.

Thus, R can be measured with an un-stabilized detector with unknown amplification. From R, then the temperature $T_{LED}$ can be determined by means of the calibration curve (FIG. 6) of the diodes.

From $T_{LED}$, a temperature dependent factor $K=L_0/L(T_{LED})$ can be determined with the dependencies $L(T_{LED})$ for each operating regime, which can correct the absolute light quantity L measured at the detector for temperature contingent fluctuations (FIG. 5). $L_0$ hereby is the corresponding peak position at a reference temperature $T_0$. The LED becomes measurement standard for the stabilization of the amplification of the light detector due to the knowledge of the correction factor K in spite of a change of the temperature $T_{LED}$. The amplification of the light detector (photo multiplier) can either be controlled by means of these values or can be corrected mathematically such that the currently measured LED peak position, for example for $U_{P1}$ and $t_{P1}$, corrected for the corresponding correction factor K, are shifted to the desired position. Thereby, it is ensured that the detector signal generated by a particular defined light quantity always generates a peak at the same position in the spectrum—the amplification of the light detector is stabilized.

Thus, R is an adequate parameter X within the above mentioned meaning, which is derived from signals of the light detector, corresponding to different operating modes of the LED, and allows a determination of the temperature of the LED or a correction of the temperature dependency of the emitted light quantity.

Figure 7:
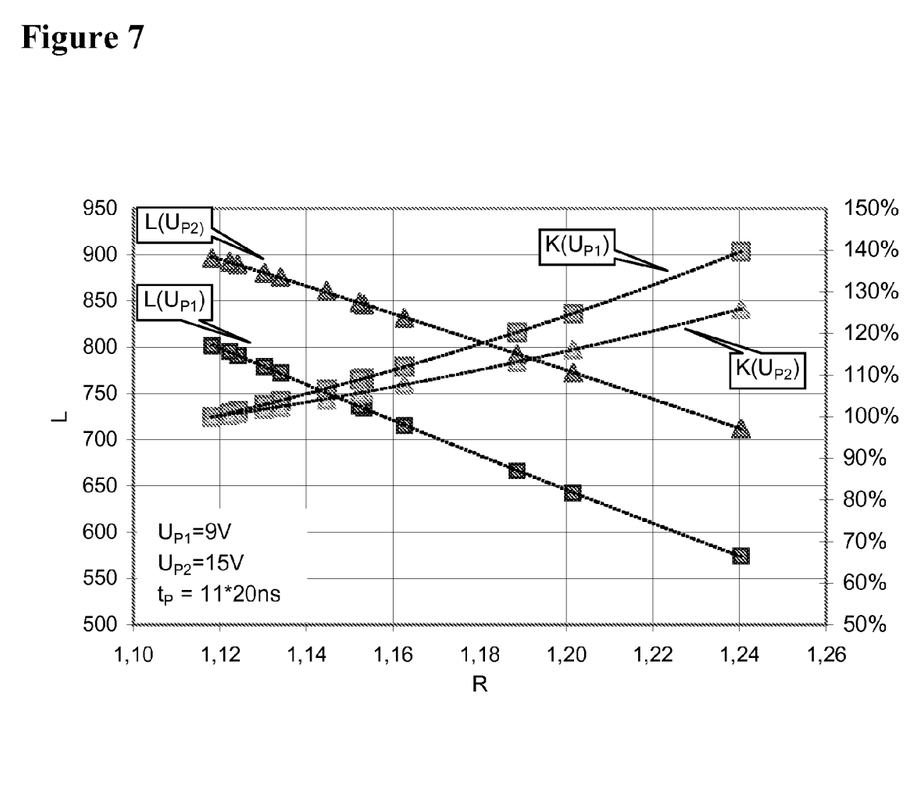
FIG. 7 Dependency of the light quantity L and the correction factors K of the light quantity ratio R (measured values) derived therefrom.

In FIG. 7, the absolute peak position L and the corresponding correction factors K for two different operating regimes are illustrated as a function of the—respectively determined from the same pulse amplitude spectrum—parameter R. The drawing shows that the determination of the temperature $T_{LED}$ can be omitted and instead, the decisive correction factor K is correlated directly to the ratio R, and then can be respectively determined from the currently measured R.

In the arrangement described above, the LED is operated with pulses of constant voltage. It is also possible, to operate the diode with pulses of constant current strength, and then to measure the resulting peak positions. The variable $I_P$ and $U_P$ are linked to each other unambiguously via the diode characteristic line of the respectively used LED. Although, the corresponding dependencies of the peak positions L and the peak position ratios R from the temperature $T_{LED}$ have another shape, they can, however, be used in the same manner for determination of a correction K correcting the temperature dependency of the light emission L of the diode.

Although the formation of the light quantity ratios already arranges for the amplification drifts of the light detector not having an influence on the determination of the correction factor R, turning on and turning off procedures can influence the light emission of the LED and their temperature dependency in an undesired manner. These effects can be additionally reduced with a further embodiment, being based on the measurement of more than two pulses.

In the following, an embodiment is described in detail, according to which as shown in FIG. 4, four pulses are measured, and, in fact, respectively two pulses at constant voltage $U_{P1}$ and different pulse durations $t_{PS}$ and $t_{PL}$ as well as two pulses of also constant voltage $U_{P2}$ and also again different pulse durations $t_{PS}$ and $t_{PL}$. However, also a larger number of pulses can be measured and analyzed, to increase the precision further.

Figure 3A:
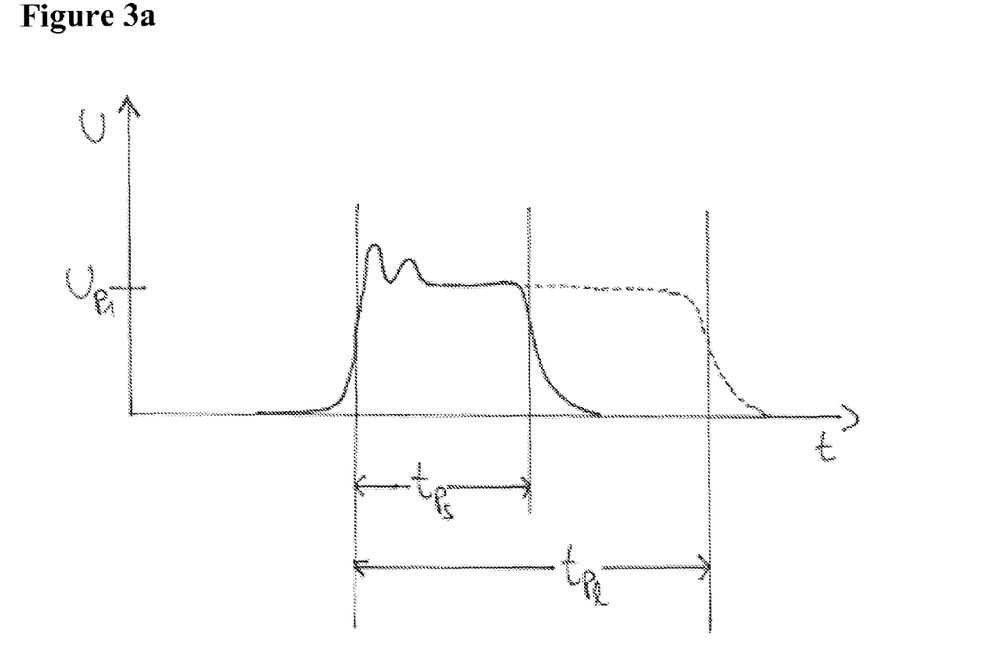
FIG. 3a Voltage courses for voltages $U_P$ at different pulse lengths $t_{PS}$ and $t_{PL}$ depending on time t.
Figure 3B:
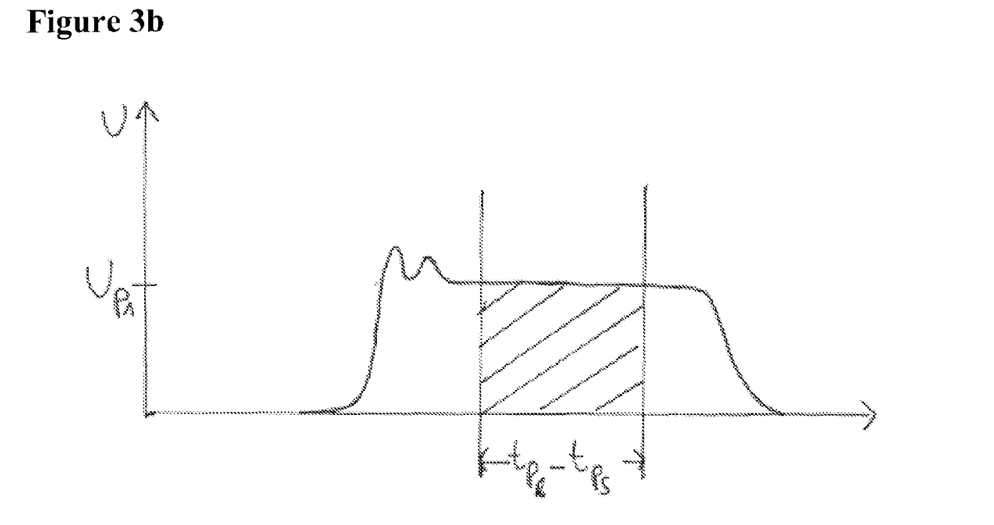
FIG. 3b Schematic illustration of the difference $D_P$ being derived from two signals of different length at equal voltage U.

FIG. 3a shows schematically the voltage course of two pulses with different pulse durations $t_{PS}$ and $t_{PL}$ at otherwise identical edge conditions, in particular at identical diode voltage $U_{P1}$. Because the voltages $U_{P1}$ of the two pulses are identical, the setting time as well as the rise time of the pulses are substantially identical also. If now the light quantity differences $L_D=L(U_{P1}; t_{PL})-L(U_{P1}; t_{PS})$ of the two pulses at constant edge conditions but different pulse durations are established, the identical diodetypical parameters are subtracted from each other and suppressed as a result such that the light quantity difference corresponds substantially to an area of the plateau region of the pulse, and therefore is determinable exactly. This is shown schematically in FIG. 3b.

This light quantity difference is now established for two different voltages $U_{P1}$ and $U_{P2}$ in the described manner, and subsequently the light quantity ratio of $L_{D1}$ to $L_{D2}$ is determined. This light quantity ratio is especially adequate to serve as parameter X, from which the correction factor K is determined:

$$K = f(X)$$

with $$X = \frac{L_{D1}}{L_{D2}} = \frac{L(U_{P1}; t_{PL}) - L(U_{P1}; t_{PS})}{L(U_{P2}; t_{PL}) - L(U_{P2}; t_{PS})}$$

Figure 8:
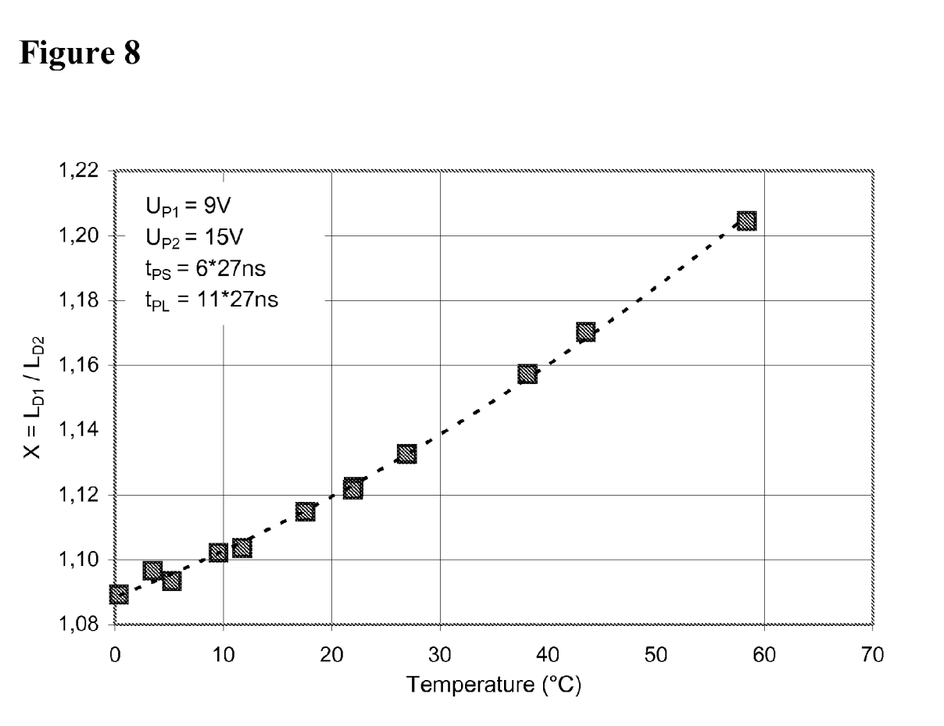
FIG. 8 Dependency of the ratio from the light quantity differences $D_{P1}$ and $D_{P2}$ from the LED temperature.

The result of measurements of the ratio of the light quantity differences for two different voltages and pulse lengths shows that this parameter correlates very well with the temperature $T_{LED}$ (FIG. 8).

Naturally, here also the variation of the light quantity cannot only result via the voltage $U_P$, but rather also via a variation of the diode current $I_P$.

For measuring the light quantities, in the present example a photo multiplier was used, whereby it is just as well possible, to use a photo diode or another form of the light detector.

As FIG. 6 and FIG. 8 show, the dependency of the parameter X from the diode temperature T usually is non-linear. The electronic determination of the correction factor K can be further simplified, if the LED is operated with a swamping resistance, and preferably this swamping resistance is selected such that this also has a non-linear behavior with respect to temperature changes. In case the parameter hereby is selected such that the non-linearity of the swamping resistance in the respectively interesting temperature range approximately compensates for the non-linearity of the parameter X, then eventually an approximately linear dependency of the correction factor K from the diode temperature T is obtained in the interesting temperature range, substantially simplifying the analysis and correction of the measurement results.

In practical application, the corresponding dependencies are to be determined previously, i.e. are to be measured usually such that a characteristic curve is generated for the concretely employed LED. This, then can be stored in form of a correction table or also of an analytic function, such that a correction of the measurement even in real time during the measurement itself can result.

For a sufficient stabilization it is satisfying, if the parameters X and K are determined in intervals, which are smaller than the time periods, in which a relevant temperature change of the LED takes place. Thereby, it is obvious that the temperature $T_{LED}$ of the LED does not have to be explicitly known for the correction of the measured light quantity, because the correction results from the signals themselves. Anyhow, it is clear that the temperature $T_{LED}$ of the LED can also be determined by means of this method, whereby the determination of the correction factor K then is determined as variable also derived from the diode temperature $T_{LED}$. In such cases, the measurement of the diode temperature $T_{LED}$ can be used for other purposes as well.

Such temperature measurements with the LED can, for example, be used for the calibration of a scintillation detector. Such a scintillation detector usually consists of a scintillator in solid, crystal or liquid form, as well as a light detector. The characteristics of the light detector, in most cases a photo cathode with photo multiplier or photo diode, depend on the temperature of photo cathode and in particular, photo multiplier. In case, a constant light quantity L is radiated into the light detector, the output signal of the light detector can be calibrated, to thus compensate for temperature contingent fluctuations. Thereby, it is not necessarily required that the radiated light quantity remains constant, but it is rather sufficient, if this is known.

In case an LED is used, connected at or in the scintillator or otherwise in the range of sight of the light detector, the emitted light quantity of which is temperature corrected according to one of the methods described above, and thus is known, the entire light detector can be calibrated with such an LED, whereby this can result online during the measurement. Due to the reasons mentioned above it is, however, possible to measure the temperature T of the system, but, in fact, it is not necessary, because the analysis of the signal value is sufficient for the calibration.

In case the LED used including the light detector is coupled to the scintillator in such a manner that the temperature of the LED corresponds substantially to that of the scintillator, it is moreover possible, to achieve a stabilization of the entire system against temperature dependency changes of the system amplification by means of the LED.

It is known that also the light emission of a scintillator depends on the temperature T. Is the temperature of the scintillator known, possibly by the analyzing of signals sent from the LED according to one of the methods described above, the yield of light of the scintillator depending on the temperature as well as the dependency of the light detector on the temperature during the measurement, can be considered such that calibration of the total system is possible over the analysis of the signals sent from the LED. Because the yield of light of the scintillator corresponds otherwise substantially to the energy of the radiation absorbed there, therewith an energy calibration of the entire detector system can result over the signal analysis of the signals triggered by the LED at the end of the light detector, without the use of, for example, a radio active calibration source being necessary for calibrating the detector system.

The invention claimed is:

1. A compensation device, comprising:
means for operating an LED in pulsed mode;
means for measuring the emitted light quantity as an output signal of the LED using a light detector, to provide a measured light output value;
means for determining a parameter that is related to the temperature of the LED in a predetermined relation, based on at least two output signals of the LED that are related to each other in a predetermined manner with respect to temperature;
means for determining a correction factor from the parameter; and
means for correcting the measured light output value for temperature-dependent fluctuations of the emitted light quantity according to the correction factor.

2. A light detector, comprising:
a signal processor; and
an optical connection adapted to connect the LED to the light detector;
wherein the signal processor includes the compensation device of claim 1;
wherein the signal processor is further adapted to generate a stabilizing factor according to signals emitted by the LED; and
wherein the signal processor is further adapted to stabilize output signals of the light detector according to the stabilizing factor.

3. The light detector of claim 2, wherein the light detector is selected from the group consisting of a photo multiplier, a hybrid photo multiplier, an Avalanche photo diode, and a photo diode with amplifier.

4. The light detector of claim 2, whereby the signal processor is adapted to digitally generate the stabilizing factor and stabilize the output signals of the light detector.

5. A scintillation detector for measuring radiation, comprising the light detector of claim 2, wherein the light detector is adapted to measure, at least partially, light generated by the scintillation detector.

6. The scintillation detector of claim 5, wherein the radiation is ionized radiation.

7. The scintillation detector of claim 5, further comprising a scintillator that absorbs the radiation and generates an output signal according at least in part to the absorbed radiation and depending on the operating temperature of the detector, and a connector that is adapted to connect the LED to the scintillation detector in a heat-conducting manner, wherein
the stabilizing factor is a first stabilizing factor,
an optical path of the optical connection between the LED and the light detector includes the scintillator,
the signal processor is adapted to determine a temperature-contingent second stabilizing factor according to first stabilizing factor and related to a temperature of the scintillator in a predetermined ratio, and
the scintillation detector is adapted to measure and stabilize the output signal according to the second stabilizing factor.

8. The scintillation detector of claim 7, wherein the signal processor is adapted to determine the temperature-contingent second stabilizing factor using a calibration table.

9. The scintillation detector of claim 7, wherein the signal processor is adapted to determine the temperature-contingent second stabilizing factor using a predetermined functional dependency from the parameter of the LED.

10. The scintillation detector of claim 7, wherein the scintillator includes a scintillation crystal.

* * * * *